United States Patent [19]
Follett et al.

[11] Patent Number: 5,834,109
[45] Date of Patent: Nov. 10, 1998

[54] PRESIZED BACKING FOR A COATED ABRASIVE ARTICLE

[75] Inventors: Gary J. Follett, St. Paul; Clayton A. George, Afton, both of Minn.

[73] Assignee: Minnesota Mining and Manufacturing Company, St. Paul, Minn.

[21] Appl. No.: 670,052

[22] Filed: Jun. 25, 1996

Related U.S. Application Data

[60] Continuation of Ser. No. 457,390, Jun. 1, 1995, Pat. No. 5,582,672, which is a division of Ser. No. 47,861, Apr. 15, 1993, Pat. No. 5,436,063.

[51] Int. Cl.⁶ .............................. B32B 5/16; B32B 27/38
[52] U.S. Cl. .......................... 428/323; 51/295; 156/279; 442/150; 442/151
[58] Field of Search .............................. 522/31, 165, 170, 522/143; 525/438; 156/279; 51/295; 427/202, 205; 442/104, 150, 151; 428/323

[56] References Cited

U.S. PATENT DOCUMENTS

| | | | |
|---|---|---|---|
| 2,015,658 | 10/1935 | Bezzenberger | 51/278 |
| 2,053,360 | 9/1936 | Benner et al. | 91/70 |
| 2,899,288 | 8/1959 | Barclay | 51/293 |
| 3,117,099 | 1/1964 | Proops et al. | 260/18 |
| 3,230,672 | 1/1966 | Anthon | 51/404 |
| 3,813,231 | 5/1974 | Gilbert et al. | 51/298 |
| 4,047,903 | 9/1977 | Hesse et al. | 51/298 |
| 4,163,647 | 8/1979 | Swiatek | 51/295 |
| 4,173,476 | 11/1979 | Smith et al. | 430/280 |
| 4,240,807 | 12/1980 | Kronzer | 51/295 |
| 4,256,828 | 3/1981 | Smith | 430/280 |
| 4,311,489 | 1/1982 | Kressner | 51/298 |
| 4,553,982 | 11/1985 | Korbel et al. | 51/298 |
| 4,588,419 | 5/1986 | Caul et al. | 51/295 |
| 4,593,051 | 6/1986 | Koleske | 522/31 |
| 4,622,349 | 11/1986 | Koleske et al. | 522/31 |
| 4,642,321 | 2/1987 | Schoenberg et al. | 523/400 |
| 4,652,275 | 3/1987 | Bloecher et al. | 51/298 |
| 4,751,138 | 6/1988 | Tumey et al. | 428/323 |
| 4,775,719 | 10/1988 | Markevka et al. | 525/125 |
| 4,799,939 | 1/1989 | Bloecher et al. | 51/293 |
| 4,812,488 | 3/1989 | Koleske et al. | 522/31 |
| 4,891,269 | 1/1990 | Markevka et al. | 428/423 |
| 4,903,440 | 2/1990 | Larson et al. | 51/298 |
| 4,920,182 | 4/1990 | Manger et al. | |
| 4,927,431 | 5/1990 | Buchanan et al. | 51/298 |
| 4,933,219 | 6/1990 | Sakumoto et al. | 428/40 |
| 4,966,609 | 10/1990 | Callinan et al. | 51/295 |
| 4,985,535 | 1/1991 | Takada et al. | 528/272 |
| 4,996,283 | 2/1991 | Greco et al. | 528/80 |
| 4,997,717 | 3/1991 | Rembold et al. | |
| 5,021,507 | 6/1991 | Stanley et al. | 525/127 |
| 5,089,536 | 2/1992 | Palazzotto | 522/16 |
| 5,262,481 | 11/1993 | Jammet | 525/125 |

FOREIGN PATENT DOCUMENTS

| | | |
|---|---|---|
| 766116 | 1/1968 | Canada . |
| 0257757 | 3/1988 | European Pat. Off. . |
| 0276716 | 8/1988 | European Pat. Off. . |
| 304026 | of 1989 | European Pat. Off. . |
| 0465351A1 | 1/1992 | European Pat. Off. . |
| 0497451A2 | 8/1992 | European Pat. Off. . |
| 0587171A1 | 3/1994 | European Pat. Off. . |
| 57-164179 | 10/1982 | Japan . |
| 1268776 | of 1989 | Japan . |
| 02239447 | 9/1990 | Japan . |
| WO92/20754 | 9/1992 | WIPO . |
| 9220754 | 11/1992 | WIPO . |
| WO93/24279 | 12/1993 | WIPO . |

OTHER PUBLICATIONS

J. Kroschivitz, Concise Encyclopedia of Polymer Science & Engineering, Copyright 1990, p. 31.

Rodriguez, Principles of Polymer Systems, Copyright 1982, 1970, pp. 326–327.

*Primary Examiner*—Michael W. Ball
*Assistant Examiner*—Sam Chuan Yao
*Attorney, Agent, or Firm*—Steven E. Skolnick; Paul W. Busse

[57] ABSTRACT

A coated abrasive article comprises a backing, a first binder on the backing, and a plurality of abrasive particles in the first binder. The first binder is a hot melt pressure sensitive adhesive that is energy cured to provide a crosslinked coating. The invention also relates to a method of producing such articles.

18 Claims, 1 Drawing Sheet

PRESIZED BACKING FOR A COATED ABRASIVE ARTICLE

This application is a continuation of application Ser. No. 08/457,390, filed Jun. 1, 1995, now U.S. Pat. No. 5,582,672, which is a division of Ser. No. 08/047,861, now U.S. Pat. No. 5,436,063, filed Apr. 15, 1993.

BACKGROUND OF THE INVENTION

1. Field of the Invention

This invention relates to coated abrasive articles and, more particularly, to such articles which incorporate an energy cured hot melt make coat.

2. Description of the Related Art

Coated abrasive articles generally comprise a backing layer to which a multiplicity of abrasive particles are bonded. In one form, the abrasive particles are bonded to the backing by a first binder, commonly referred to as a make coat. A second binder, commonly called a size coat, is then applied over the make coat and the abrasive particles to reinforce the particles. In a second form, the abrasive particles are dispersed in a binder to provide an abrasive composite and the composite is bonded to the backing by the binder.

Porous cloth, fabric and textile materials are frequently used as backings for coated abrasive articles. The make coat is typically applied to the backing as a low viscosity material. In this condition, the make coat can migrate into the backing and accumulate in the interstices formed by the intersecting warp and fill fibers of the porous backing. This can result in the backing becoming stiff, hard and brittle with a consequent loss of its natural pliability. However, flexible, pliable, coated abrasive articles are desired. As a result, it has become conventional to employ a presize or saturant coat to seal the porous backing even though this added processing step increases the cost and complexity of manufacturing.

U.S. Pat. No. 4,163,647 "Method for Producing Coated Abrasives," issued Aug. 7, 1979 to H. J. Swiatek proposes coating a cloth backing material on its front side with a liquid thermosetting resin in such a manner that the resin does not permeate the interstices of the cloth. Suggested liquid thermosetting resins include heat hardenable phenol-formaldehydes.

U.S. Pat. No. 4,751,138 "Coated Abrasive Having Radiation Curable Binder," issued Jun. 14, 1988 to M. L. Tumey et al. discloses a radiation curable epoxy-based make coat. Reportedly, the radiation curable composition can be used to treat the backing material; for example, by saturating it or providing a front coat therefor.

U.S. Pat. No. 4,927,431 "Binder for Coated Abrasives," issued May 22, 1990 to S. J. Buchanan et al. discloses an abrasive product which utilizes a binder formed from a blend of a radiation curable monomer and a thermally curable resinous material. The binder bonds abrasive grains to a major surface of a backing sheet and can also function as a backing treatment for the coated abrasive article.

U.S. Pat. No. 4,240,807 "Substrate Having a Thermoplastic Binder Coating for Use in Fabricating Abrasive Sheets and Abrasive Sheets Manufactured Therewith," issued Dec. 23, 1980 to F. J. Kronzer discloses a flexible backing material which has a heat activated binder on one surface thereof. The binder is reportedly a nontacky solid at ambient temperatures, but when heated is converted to a viscous fluid that permits abrasive grains deposited thereon to sink into the coating to a depth which provides a firm bond therewith. When the heat is removed, the coating reverts to its solid nontacky state.

However, there remains considerable need for a make coat which can be readily applied to a porous cloth, fabric or textile backing without the need for a separate presize or saturant coat to seal the backing.

SUMMARY OF THE INVENTION

In general, this invention relates to a coated abrasive article that comprises a backing, a first binder or make coat on the backing, and a plurality of abrasive particles in the first binder. Many of the coated abrasive articles further include a second binder, such as a glue or a cured resinous adhesive, over the first binder and the abrasive particles, as well as a third binder over the second binder.

The first binder is a hot melt pressure sensitive adhesive that has been energy cured to provide a crosslinked coating. Because the first binder is a hot melt composition it is particularly useful with porous cloth, textile or fabric backings. The first binder does not penetrate the interstices of the porous backing, thereby preserving the natural flexibility and pliability of the backing.

In a broad aspect of the invention, the first binder comprises an epoxy-containing material, a polyester component, and an effective amount of an initiator for energy curing the binder. More particularly, the first binder comprises from about 2 to 95 parts of the epoxy-containing material and, correspondingly, from about 98 to 5 parts of the polyester component, as well as the initiator. An optional hydroxyl-containing material having a hydroxyl functionality greater than 1 may also be included.

Preferably, the polyester component has a Brookfield viscosity which exceeds 10,000 milliPascals at 121° C. with a number average molecular weight of about 7500 to 200,000, more preferably from about 10,000 to 50,000, and most preferably from about 15,000 to 30,000. The polyester component may be the reaction product of a dicarboxylic acid selected from the group consisting of saturated aliphatic dicarboxylic acids containing from 4 to 12 carbon atoms (and diester derivatives thereof) and aromatic dicarboxylic acids containing from 8 to 15 carbon atoms (and diester derivatives thereof) and (b) a diol having 2 to 12 carbon atoms.

The optional hydroxyl-containing material more preferably has a hydroxyl functionality of at least 2 and even more preferably a hydroxyl functionality of about 3. Particularly preferred materials are polyoxyalkylene polyols such as polyoxyethylene glycols and polyoxypropylene glycols having a number average equivalent weight of about 31 to 2250, and polyoxyethylene triols and polyoxypropylene triols having a number average equivalent weight of about 80 to 350. Polyoxyalkylene polyols are especially preferred when the initiator is an aromatic sulfonium complex salt or an aromatic iodonium complex salt. Also useful is cyclohexane dimethanol, especially if the initiator is a metallocene salt. The hydroxyl-containing material is useful in enhancing the flexibility of the first binder and can sufficiently retard the curing reaction after the first binder has been exposed to energy so as to permit abrasive particles to be adhered thereto.

In more preferred first binders, the epoxy-containing material comprises from 2 to 80 parts thereof and the polyester component comprises, correspondingly, from 98 to 20 parts thereof. Even more preferred are first binders comprising from 2 to 60 parts of the epoxy-containing material and, correspondingly, from 98 to 40 parts of the polyester component.

The invention also relates to a method of providing such coated abrasive articles. The energy curable, hot melt pressure sensitive first binder is applied (preferably by coating) to the backing and is exposed to energy (preferably actinic radiation). A plurality of abrasive particles is deposited in the first binder either before after it is exposed to energy. The binder is then permitted to cure to a crosslinked coating. The pressure sensitive properties of the first binder (before it finally cures) permits the abrasive particles to adhere thereto. The first binder can be thermally postcured.

BRIEF DESCRIPTION OF THE DRAWINGS

The invention will be more fully understood with reference to the following drawings in which similar reference numerals designate like or analogous components throughout and in which.

DETAILED DESCRIPTION OF THE PREFERRED EMBODIMENTS

Figure 1:
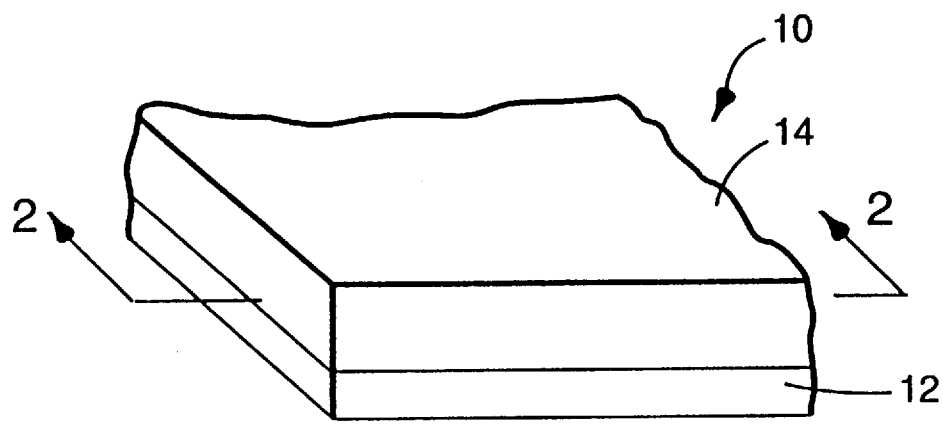
FIG. 1 is a perspective view of a coated abrasive article according to the invention.
Figure 2:
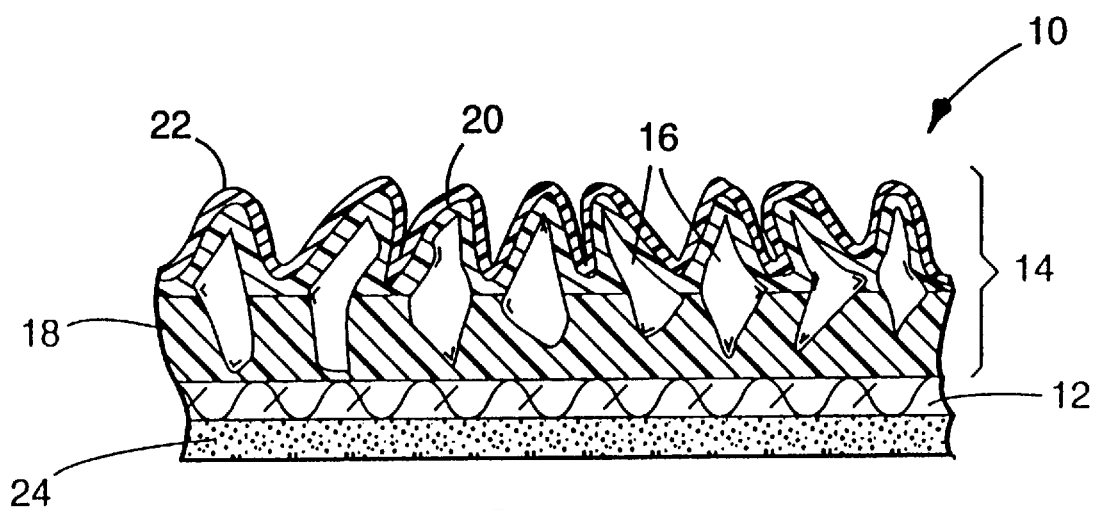
FIG. 2 is a sectional view of a coated abrasive article according to the invention and taken along lines 2—2 of FIG. 1.

Turning now to the drawings, FIGS. 1 and 2 illustrate a coated abrasive article 10 according to the invention comprising a backing 12 and an abrasive layer 14 bonded thereto.

Backing 12 may be comprised of cloth, vulcanized fiber, paper, nonwoven materials, polymeric films, and laminated multilayer combinations thereof. Cloth backings may be woven or stitch bonded and may include fibers or yarns of cotton, polyester, rayon, silk, nylon or blends thereof. Nonwoven backings may comprise cellulosic fibers, synthetic fibers or blends thereof. As explained below, porous cloth, fabric or textile backings are especially advantageously employed in the coated abrasive articles of the invention.

Abrasive layer 14 comprises a multiplicity of abrasive particles 16 which are bonded to a major surface of backing 12 by a first binder or make coat 18. A second binder or size coat 20 is applied over the abrasive particles and the make coat to reinforce the particles. The abrasive particles typically have a size of about 0.1 to 1500 microns ($\mu$m), more preferably from about 1 to 1300 $\mu$m. Preferably the abrasive particles have a MOH hardness of at least about 8, more preferably greater than 9. Examples of useful abrasive particles include aluminum-oxide based materials (e.g., aluminum oxide, ceramic aluminum oxide (which may include one or more metal oxide modifiers), and heat treated aluminum oxide), silicon carbide, confused alumina-zirconia, diamond, ceria, cubic boron nitride, garnet and blends thereof. Abrasive particles also include abrasive agglomerates such as disclosed in U.S. Pat. No. 4,652,275 and U.S. Pat. No. 4,799,939, which patents are hereby incorporated by reference.

First binders useful in the coated abrasive articles of the invention comprise a hot melt pressure sensitive adhesive composition that cures upon exposure to energy to provide a covalently crosslinked, thermoset make coat. Because the make coat can be applied as a hot melt composition, it does not readily penetrate the backing so as to compromise the backing's inherent pliability and flexibility. Consequently, the make coats disclosed herein are particularly advantageous when employed in conjunction with porous cloth, fabric or textile backings.

By "porous" is meant a backing not having an abrasive layer, a make coat, an adhesive layer, a sealant, a saturant coat, a presize coat, a backsize coat, etc. thereon and which demonstrates a Gurley porosity of less than 50 seconds when measured according to Federal Test Method Std. No. 191, Method 5452 (published Dec.31, 1968) (as referred to in the *Wellington Sears Handbook of Industrial Textiles* by E. R. Kaswell, 1963 edition, page 575) using a Gurley Permeometer (available from Teledyne Gurley, Inc., Troy, N.Y). Cloth backings of presently known coated abrasive articles conventionally require special treatments such as a saturant coat, a presize coat, a backsize coat or a subsize coat to protect the cloth fibers and to seal the backing. Coated abrasive articles according to the invention, however, require no such treatment, yet remain durable and flexible. While the coated abrasive articles of the invention do not require these treatments, they may be provided, if desired. The hot melt make coats of the invention can provide such treatments.

The pressure sensitive adhesive qualities of the hot melt make coat enable the abrasive particles to adhere to the make coat until the size coat is applied thereover. The crosslinked, thermoset make coat is tough, yet flexible, and aggressively adheres to the backing.

As used herein, a "hot melt" composition refers to a composition that is a solid at room temperature (about 20° to 22° C. ) but which, upon heating, melts to a viscous liquid that can be readily applied to a coated abrasive article backing. Desirably, the hot melt make coats of the invention can be formulated as solvent free systems (i.e., they have less than 1% solvent in the solid state). As used herein, a "pressure sensitive adhesive" refers to a hot melt composition that, at the time abrasive particles are applied thereto, displays pressure sensitive properties. Pressure sensitive properties means that in response to the application of at least light pressure, the composition is tacky immediately after application to a backing and while still warm and, in some cases, even after it has cooled to room temperature.

The hot melt make coats useful in the invention comprise and, more preferably, consist essentially of, an epoxy-containing material that contributes to the toughness and durability of the make coat, a polyester component that allows for the make coat to display pressure sensitive properties, and an initiator that permits the composition to cure upon exposure to energy. Optionally, though quite desirably, the hot melt make coats of the invention may also include a hydroxyl-containing material to retard the rate of curing and/or impart flexibility to the make coats.

Epoxy-containing materials useful in the make coats of the invention are any organic compounds having at least one oxirane ring

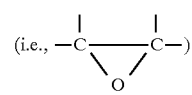

polymerizable by a ring opening reaction. Such materials, broadly called epoxides, include both monomeric and polymeric epoxides and can be aliphatic, cycloaliphatic, or aromatic. They can be liquid or solid or blends thereof, blends being useful in providing tacky adhesive films. These materials generally have, on the average, at least two epoxy groups per molecule (preferably more than two epoxy groups per molecule). The polymeric epoxides include linear polymers having terminal epoxy groups (e.g., a diglycidyl ether of a polyoxyalkylene glycol), polymers having skeletal oxirane units (e.g., polybutadiene polyepoxide), and polymers having pendent epoxy groups (e.g., a glycidyl methacrylate polymer or copolymer). The molecular weight of the epoxy-containing material may vary from 58 to about 100,000 or more. Mixtures of various epoxy-containing materials can also be used in the hot melt compositions of the invention. The "average" number of epoxy groups per molecule is defined as the number of epoxy groups in the epoxy-containing material divided by the total number of epoxy molecules present.

Useful epoxy-containing materials include those which contain cyclohexene oxide groups such as the epoxycyclohexanecarboxylates, typified by 3,4-epoxycyclohexylmethyl-3,4-epoxycyclohexanecarboxylate, 3,4-epoxy-2-methylcyclohexylmethyl-3,4-epoxy-2-methycyclohexane carboxylate, and bis(3,4-epoxy-6-methylcyclohexylmethyl)adipate. For a more detailed list of useful epoxides of this nature, reference may be made to U.S. Pat. No. 3,117,099.

Further epoxy-containing materials which are particularly useful in the practice of this invention include glycidyl ether monomers of the formula

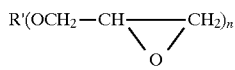

where R' is alkyl or aryl and n is an integer of 1 to 6. Examples are the glycidyl ethers of polyhydric phenols obtained by reacting a polyhydric phenol with an excess of chlorohydrin such as epichlorohydrin (e.g., the diglycidyl ether of 2,2-bis-(2,3epoxypropoxyphenol)propane). Further examples of epoxides of this type which can be used in the practice of this invention are described in U.S. Pat. No. 3,018,262.

There is a host of commercially available epoxy-containing materials which can be used in this invention. In particular, epoxides which are readily available include octadecylene oxide, epichlorohydrin, styrene oxide, vinyl cyclohexene oxide, glycidol, glycidylmethacrylate, diglycidyl ether of Bisphenol A (e.g., those available under the trade designations EPON 828, EPON 1004, and EPON 1001F from Shell Chemical Co., and DER-332 and DER-334, from Dow Chemical Co.), diglycidyl ether of Bisphenol F (e.g., ARALDITE GY281 from Ciba-Geigy), vinylcyclohexene dioxide (e.g., ERL 4206 from Union Carbide Corp.), 3,4-epoxycyclohexylmethyl-3,4-epoxycyclohexene carboxylate (e.g., ERL-4221 from Union Carbide Corp.), 2-(3,4-epoxycylohexyl-5,5-spiro-3,4-epoxy)cyclohexane-metadioxane (e.g., ERL-4234 from Union Carbide Corp.), bis(3,4epoxycyclohexyl) adipate (e.g., ERL-4299 from Union Carbide Corp.), dipentene dioxide (e.g., ERL-4269 from Union Carbide Corp.), epoxidized polybutadiene (e.g., OXIRON 2001 from FMC Corp.), silicone resin containing epoxy functionality, epoxy silanes (e.g., beta-(3,4-epoxycyclohexyl)ethyltrimethoxy silane and gamma-glycidoxypropyltrimethoxy silane, commercially available from Union Carbide), flame retardant epoxy resins (e.g., DER-542, a brominated bisphenol type epoxy resin available from Dow Chemical Co.), 1,4-butanediol diglycidyl ether (e.g., ARALDITE RD-2 from Ciba-Geigy), hydrogenated bisphenol A-epichlorohydrin based epoxy resins (e.g. EPONEX 1510 from Shell Chemical Co.), and polyglycidyl ether of phenolformaldehyde novolak (e.g., DEN-431 and DEN-438 from Dow Chemical Co.).

Useful polyester components include both hydroxyl and carboxyl terminated materials, which may be amorphous or semicrystalline. Hydroxyl terminated materials are preferred. By "amorphous" is meant a material that displays a glass transition temperature but does not display a measurable crystalline melting point by differential scanning calorimetry (DSC). Preferably the glass transition temperature is less than the decomposition temperature of the initiator (discussed below), but without being more than about 120° C. By "semicrystalline" is meant a polyester component that displays a crystalline melting point by DSC, preferably with a maximum melting point of about 150° C.

The viscosity of the polyester component is important in providing a hot melt make coat (as opposed to a make coat which is a liquid having a measurable viscosity at room temperature). Accordingly, polyester components useful in the make coats of the invention preferably have a Brookfield viscosity which exceeds 10,000 milliPascals at 121° C. Viscosity is related to the molecular weight of the polyester component. Preferred polyester components also have a number average molecular weight of about 7500 to 200,000, more preferably from about 10,000 to 50,000 and most preferably from about 15,000 to 30,000.

Polyester components useful in the make coats of the invention comprise the reaction product of dicarboxylic acids (or their diester derivatives) and diols. The diacids (or their diester derivatives) can be saturated aliphatic acids containing from 4 to 12 carbon atoms (including unbranched, branched, or cyclic materials having 5 to 6 atoms in a ring) and/or aromatic acids containing from 8 to 15 carbon atoms. Examples of suitable aliphatic acids are succinic, glutaric, adipic, pimelic, suberic, azelaic, sebacic, 1,12 dodecanedioic, 1,4-cyclohexanedicarboxylic, 1,3-cyclopentanedicarboxylic, 2-methylsuccinic, 2-methylpentanedioic, 3-methylhexanedioic acids and the like. Suitable aromatic acids include terephthalic acid, isophthalic acid, phthalic acid, 4,4'-benzophenone dicarboxylic acid, 4,4'-diphenylmethanedicarboxylic acid, 4,4'-diphenylether dicarboxylic acid, 4,4'-diphenylthioether dicarboxylic acid and 4,4'-diphenylamine dicarboxylic acid. Preferably the structure between the two carboxyl groups in these diacids contains only carbon and hydrogen; more preferably it is a phenylene group. Blends of any of the foregoing diacids may be used.

The diols include branched, unbranched, and cyclic aliphatic diols having from 2 to 12 carbon atoms, such as, for example, ethylene glycol, 1,3-propylene glycol, 1,2-propylene glycol, 1,4-butanediol, 1,3-butanediol, 1,5-pentanediol, 2-methyl-2,4-pentanediol, 1,6-hexanediol, 1,8-octanediol, cyclobutane-1,3-di(2'ethanol), cyclohexane-1,4-dimethanol, 1,10-decanediol, 1,12-dodecanediol, and neopentyl glycol. Long chain diols including poly (oxyalkylene) glycols in which the alkylene group contains from 2 to 9 carbon atoms (preferably 2 to 4 carbon atoms) may also be used. Blends of any of the foregoing diols may be used.

Useful, commercially available hydroxyl terminated polyester materials include various saturated, linear, semi-crystalline copolyesters available from Hüls America, Inc. such as DYNAPOL S1402, DYNAPOL S1358, DYNAPOL S1227, DYNAPOL S1229 and DYNAPOL S1401. Useful saturated, linear amorphous copolyesters available from Hüls America, Inc. include DYNAPOL S1313 and DYNAPOL S1430.

The initiator functions to promote curing or covalent crosslinking of the hot melt make coat. The initiator may be activated by electromagnetic radiation (e.g., light having a wavelength in the ultraviolet or visible regions of the electromagnetic spectrum), by accelerated particles (e.g., electron beam radiation), or thermally (e.g., heat or infrared radiation). Preferably, the initiators are photoactive; that is, they are photoinitiators activated by actinic radiation (radiation having a wavelength in the ultraviolet or visible portion of the electromagnetic spectrum).

Initiators which are useful in the make coats of the invention are generally of three types, viz. aromatic iodonium complex salts, aromatic sulfonium complex salts and metallocene salts. Preferably, these three types are selected to be photoinitiators.

Useful aromatic iodonium complex salts have the formula:

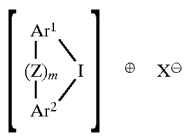

where $Ar^1$ and $Ar^2$ are aromatic groups having 4 to 20 carbon atoms and are selected from the group consisting of phenyl, thienyl, furanyl and pyrazolyl groups. Z is selected from the group consisting of oxygen; sulfur;

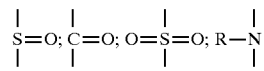

where R is aryl (of 6 to 20 carbons, such as phenyl) or acyl (of 2 to 20 carbons, such as acetyl, benzoyl, etc.); a carbon-to-carbon bond; or

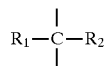

where $R_1$ and $R_2$ are selected from hydrogen, alkyl radicals of 1 to 4 carbons, and alkenyl radicals of 2 to 4 carbons. The value of m is zero or 1 and X is a halogen-containing complex anion selected from tetrafluoroborate, hexafluorophosphate, pentafluorohydroxyantimonate, hexafluoroarsenate, and hexafluoroantimonate.

The $Ar^1$ and $Ar^2$ aromatic groups may optionally have one or more fused benzo rings (e.g., naphthyl, benzothienyl, dibenzothienyl, benzofuranyl, dibenzofuranyl, etc.). The aromatic groups may also be substituted, if desired, by one or more non-basic groups if they are essentially non-reactive with epoxide and hydroxyl functionalities.

Useful aromatic iodonium complex salts are described more fully in U.S. Pat. No. 4,256,828. The preferred aromatic iodonium complex salts are diaryliodonium hexafluorophosphate and diaryliodonium hexafluoroantimonate.

The aromatic iodonium complex salts useful in the make coats of the invention are photosensitive only in the ultraviolet region of the spectrum. They, however, can be sensitized to the near ultraviolet and the visible range of the spectrum by sensitizers for known photolyzable organic halogen compounds. Illustrative sensitizers include aromatic amines and colored aromatic polycyclic hydrocarbons.

Aromatic sulfonium complex salt initiators suitable for use in the make coats of the invention can be defined by the formula

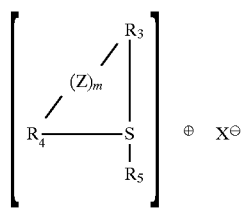

wherein $R_3$, $R_4$ and $R_5$ can be the same or different, provided that at least one of the groups is aromatic. These groups can be selected from aromatic moieties having 4 to 20 carbon atoms (e.g., substituted and unsubstituted phenyl, thienyl, and furanyl) and alkyl radicals having 1 to 20 carbon atoms. The term "alkyl" includes substituted alkyl radicals (for example, substituents such as halogen, hydroxy, alkoxy, aryl). Preferably, $R_3$, $R_4$ or $R_5$ are each aromatic. Z, m and X are all as defined above with regard to the iodonium complex salts.

If $R_3$, $R_4$ or $R_5$ is an aromatic group, it may optionally have one or more fused benzo rings (e.g, naphthyl, benzothienyl, dibenzothienyl, benzofuranyl, dibenzofuranyl, etc.) Such aromatic groups may also be substituted, if desired, by one or more non-basic groups that are essentially non-reactive with epoxide and hydroxyl functionality.

The triaryl-substituted salts such as triphenylsulfonium hexafluoroantimonate are the preferred sulfonium salts. Useful sulfonium complex salts are described more fully in U.S. Pat. No. 4,256,828.

The aromatic sulfonium complex salts useful in the invention are inherently photosensitive only in the ultraviolet region of the spectrum. They, however, are sensitized to the near ultraviolet and the visible range of the spectrum by a select group of sensitizers such as described in U.S. Pat. No. 4,256,828.

Useful metallocene salts can have the formula:

$$[(L^1)(L^2)M^p] + {}^qY_r$$

wherein:

$M^p$ represents a metal selected from Cr, Mo, W. Mn, Re, Fe, and Co;

$L^1$ represents 1 or 2 ligands contributing π-electrons that can be the same or different ligand selected from substituted and unsubstituted $\eta^3$-allyl, $\eta^5$-cyclopentadienyl, and $\eta^7$-cycloheptatrienyl and $\eta^6$-aromatic compounds selected from $\eta^6$-benzene and substituted $\eta^6$-benzene compounds and compounds having 2 to 4 fused rings each capable of contributing 3 to 8 π-electrons to the valence shell of $M^P$;

$L^2$ represents none or 1 to 3 ligands contributing an even number of sigma-electrons that can be the same or different ligand selected from carbon monoxide or nitrosonium;

with the proviso that the total electronic charge contributed to $M^p$ by $L^1$ and $L^2$ plus the ionic charge on the metal $M^P$ results in a net residual positive charge of q to the complex, and q is an integer having a value of 1 or 2, the residual electrical charge of the complex cation;

Y is a halogen-containing complex anion selected from $AsF_6-$, $SbF_6-$ and $SbF_5OH-$; and r is an integer having a value of 1 or 2, the numbers of complex anions required to neutralize the charge q on the complex cation.

Useful metallocene salts are described more fully in U.S. Pat. No. 5,089,536. It is desirable for the metallocene salt initiators to be accompanied by an accelerator such as an oxalate ester of a tertiary alcohol, although this is optional. The accelerator preferably comprises from about 0.1 to 4% of the make coat based on the combined weight of the epoxy-containing material and the polyester component, more preferably about 60% of the weight of the metallocene initiator.

Useful commercially available initiators include FX-512, an aromatic sulfonium complex salt (3M Company), UVI-6974, an aromatic sulfonium complex salt (Union Carbide Corp.),and IRGACURE 261, a metallocene complex salt (Ciba-Geigy).

Optionally, the hot melt make coats of the invention may further comprise a hydroxyl-containing material. The hydroxyl-containing material may be any liquid or solid organic material having hydroxyl functionality of at least 1, preferably at least 2,and most preferably about 3. The hydroxyl-containing organic material should be free of other "active hydrogen" containing groups such as amino and mercapto moieties. The hydroxyl-containing organic material should also be substantially free of groups which may be thermally or photolytically unstable so that the material will not decompose or liberate volatile components at temperatures below about 100° C. or when exposed to the energy source during curing. Preferably the organic material contains two or more primary or secondary aliphatic hydroxyl groups (i.e., the hydroxyl group is bonded directly to a non-aromatic carbon atom). The hydroxyl group may be terminally situated, or may be pendent from a polymer or copolymer. The number average equivalent weight of the hydroxyl-containing material is preferably about 31 to 2250, more preferably about 80 to 1000, and most preferably about 80 to 350.

Representative examples of suitable organic materials having a hydroxyl functionality of 1 include alkanols, monoalkyl ethers of polyoxyalkylene glycols, and monoalkyl ethers of alkylene glycols.

Representative examples of useful monomeric polyhydroxy organic materials include alkylene glycols (e.g., 1,2-ethanediol, 1,3-propanediol, 1,4-butanediol, 2-ethyl-1,6-hexanediol, 1,4-cyclohexane dimethanol, 1,18-dihydroxyoctadecane, and 3-chloro-1,2-propanediol), polyhydroxyalkanes (e.g., glycerine, trimethylolethane, pentaerythritol, and sorbitol) and other polyhydroxy compounds such as N,N-bis(hydroxyethyl)benzamide, 2-butene-1,4-diol, castor oil, etc.

Representative examples of useful polymeric hydroxyl-containing materials include polyoxyalkylene polyols (e.g., polyoxyethylene and polyoxypropylene glycols and triols of equivalent weight of 31 to 2250 for the diols or 80 to 350 for triols), polytetramethylene oxide glycols of varying molecular weight, hydroxyl-terminated polyesters, and hydroxyl-terminated polylactones.

Useful commercially available hydroxyl-containing materials include the POLYMEG series (available from QO Chemicals, Inc.) of polytetramethylene oxide glycols such as POLYMEG 650, 1000 and 2000; the TERATHANE series (from E. I. duPont de Nemours and Company) of polytetramethylene oxide glycols such as TERATHANE 650, 1000 and 2000; POLYTHF, a polytetramethylene oxide glycol from BASF Corp.; the BUTVAR series (available from Monsanto Chemical Company) of polyvinylacetal resins such as BUTVAR B-72A, B-73, B-76, B-90 and B-98; the TONE series (available from Union Carbide) of polycaprolactone polyols such as TONE 0200, 0210, 0230, 0240, and 0260; the DESMOPHEN series (available from Miles Inc.) of saturated polyester polyols such as DESMOPHEN 2000, 2500, 2501, 2001KS, 2502, 2505, 1700, 1800, and 2504; the RUCOFLEX series (available from Ruco Corp.) of saturated polyester polyols such as S-107, S-109, S-1011 and S-1014; VORANOL 234-630 (a trimethylol propane) from Dow Chemical Company; VORANOL 230-238 (a glycerol polypropylene oxide adduct) from Dow Chemical Company; the SYNFAC series (from Milliken Chemical) of polyoxyalkylated bisphenol A's such as SYNFAC 8009, 773240, 8024, 8027, 8026, and 8031; and the ARCOL series (from Arco Chemical Co.) of polyoxypropylene polyols such as ARCOL 425, 1025, 2025, 42, 112, 168, and 240.

The amount of hydroxyl-containing organic material used in the make coats of the invention may vary over a broad range, depending on factors such as the compatibility of the hydroxyl-containing material with both the epoxy-containing material and the polyester component, the equivalent weight and functionality of the hydroxyl-containing material, and the physical properties desired in the final cured make coat.

The optional hydroxyl-containing material is particularly useful in tailoring the flexibility of the hot melt make coats of the invention. As the equivalent weight of the hydroxyl-containing material increases, the flexibility of the hot melt make coat correspondingly increases although there may be a consequent loss in cohesive strength. Similarly, decreasing equivalent weight may result in a loss of flexibility with a consequent increase in cohesive strength. Thus, the equivalent weight of the hydroxyl-containing material is selected so as to balance these two properties.

If the hydroxyl-containing material is used to tailor the flexibility of the hot melt make coat, polyoxyethylene glycols and triols having an equivalent weight of about 31 to 2250 for the glycols and 80 to 350 for the triols are particularly preferred. Even more preferred are polyoxypropylene glycols and triols having a hydroxyl functionality greater than 2 and an equivalent weight of about 31 to 2250 for the glycols and 80 to 350 for the triols. Polyoxyalkylene polyols are most advantageously employed when the initiator is either an aromatic iodonium complex salt or an aromatic sulfonium complex salt. If metallocene salts are used as the initiator, 1,4 cyclohexanedimethanol is a particularly preferred flexiblizer.

As explained more fully hereinbelow, the incorporation of polyether polyols into the hot melt make coats of the invention is especially desirable for adjusting the rate at which the make coats cure upon exposure to energy. Useful polyether polyols (i.e., polyoxyalkylene polyols) for adjusting the rate of cure include polyoxyethylene and polyoxypropylene glycols and triols having an equivalent weight of about 31 to 2250 for the diols and about 80 to 350 for the triols, as well as polytetramethylene oxide glycols of varying molecular weight and polyoxyalkylated bisphenol A's. Polyether polyols as cure inhibitors are best used in conjunction with aromatic iodonium complex salts and aromatic sulfonium complex salts. Metallocene salt initiators inherently provide a delayed cure which need not be further retarded by the inclusion of a polyether polyol.

The hot melt make coats of the invention comprise from 2 to 95 parts per 100 parts total of the epoxy-containing material and, correspondingly, from 98 to 5 parts of the polyester component. More preferably, the hot melt make coats of the invention comprise from 2 to 80 parts of the epoxy-containing material and, correspondingly, from 98 to 20 parts of the polyester component. Increasing amounts of the epoxy-containing material relative to the polyester component tend to result in stiffer make coats. Thus, the relative amounts of these two ingredients are balanced depending on the properties sought in the final make coat.

The initiator is included in an amount ranging from about 0.1 to 4% based on the combined weight of the epoxy-containing material and the polyester component. Increasing amounts of the initiator result in an accelerated curing rate but require that the hot melt make coat be applied in a thinner layer so as to avoid curing only at the surface. Increased amounts of initiator can also result in reduced energy exposure requirements and a shortened pot life at application temperatures. The amount of the initiator is determined by the rate at which the make coat should cure, the intensity of the energy source, and the thickness of the make coat.

The relative amount of the optional hydroxyl-containing organic material is determined with reference to the ratio of the number of hydroxyl groups to the number of epoxy groups in the hot melt make coat. That ratio may range from 0:1 to 1:1, more preferably from about 0.4:1 to 0.8:1. Larger amounts of the hydroxyl-containing material increase the flexibility of the hot melt make coat but with a consequent loss of cohesive strength. If the hydroxyl containing material is a polyether polyol, increasing amounts will further slow the curing process.

Size coat 20 is applied over abrasive particles 16 and make coat 18. The size coat may comprise a glue or a cured resinous adhesive. Examples of suitable resinous adhesives include phenolic, aminoplast, urethane, acrylated urethane, epoxy, acrylated epoxy, isocyanurate, acrylated isocyanurate, ethylenically unsaturated, urea-formaldehyde, bis-maleimide and fluorene-modified epoxy resins as well as mixtures thereof. Precursors for the size coat may further include catalysts and/or curing agents to initiate and/or accelerate the curing process described hereinbelow. The size coat is selected based on the desired characteristics of the finished coated abrasive article.

Both the make and size coats may additionally comprise various optional additives such as fillers, grinding aids, fibers, lubricants, wetting agents, surfactants, pigments, antifoaming agents, dyes, coupling agents, plasticizers and suspending agents so long as they do not adversely affect the pressure sensitive adhesive properties of the make coat (before it fully cures) or detrimentally effect the ability of the make coat to cure upon exposure to energy. Examples of useful fillers include calcium carbonate, calcium metasilicate, silica, silicates, sulfate salts and combinations thereof. Grinding aids useful in the practice of the invention include cryolite, ammonium cryolite and potassium tetrafluoroborate.

Abrasive layer 14 may further comprise a third binder or super size coating 22. One useful super size coating comprises a grinding aid, such as potassium tetrafluoroborate, and an adhesive, such as an epoxy resin. Super size coating 22 may be included to prevent or reduce the accumulation of swarf (the material abraded from a workpiece) between abrasive particles which can dramatically reduce the cutting ability of the abrasive article. Materials useful in preventing swarf accumulation include metal salts of fatty acids (e.g., zinc stearate), urea-formaldehydes, waxes, mineral oils, crosslinked silanes, crosslinked silicones, fluorochemicals and combinations thereof.

An optional back size coating 24 such as an antislip layer comprising a resinous adhesive having filler particles dispersed therein or a pressure sensitive adhesive for bonding the coated abrasive article to a support pad may be provided on backing 12. Examples of suitable pressure sensitive adhesives include latex, crepe, rosin, acrylate polymers (e.g., polybutyl acrylate and polyacrylate esters), acrylate copolymers (e.g., isooctylacrylate/acrylic acid), vinyl ethers (e.g., polyvinyl n-butyl ether), alkyd adhesives, rubber adhesives (e.g., natural rubbers, synthetic rubbers and chlorinated rubbers), and mixtures thereof.

The back size coating may also be an electrically conductive material such as vanadium pentoxide (in, for example, a sulfonated polyester), or carbon black or graphite in a binder. Examples of useful conductive back size coatings are disclosed in U.S. Pat. No. 5,108,463 and U.S. Pat. No. 5,137,452, which patents are incorporated herein by reference.

In order to promote the adhesion of make coat 18 and/or back size coating 24 (if such be included), it may be necessary to modify the surface to which these layers are applied. Appropriate surface modifications include corona discharge, ultraviolet light exposure, electron beam exposure, flame discharge and scuffing.

Alternatively, although not shown specifically in the drawings, abrasive layer 14 may comprise a multiplicity of abrasive particles which are dispersed in the make coat. Such structures may further comprise an optional super size coating, such as described above, over the make coat. Both the construction illustrated in FIG. 2 and one in which the abrasive particles are dispersed in a make coat are considered exemplary of abrasive layers comprising abrasive particles in a make coat or a first binder.

Coated abrasive articles according to the invention may be made by applying abrasive layer 14 to a preformed backing 12. The hot melt make coat is prepared by mixing the various ingredients in a suitable vessel, preferably one that is not transparent to actinic radiation, at an elevated temperature sufficient to liquify the materials so that they may be efficiently mixed but without thermally degrading them (e.g., a temperature of about 120° C.) with stirring until the components are thoroughly melt blended. The components may be added simultaneously or sequentially, although it is preferred to first blend the epoxy-containing material and the polyester component followed by the addition of the hydroxyl-containing material and then the initiator.

The hot melt make coat should be compatible in the melt phase. That is, there should be no visible gross phase separation among the components. The make coat may be used directly after melt blending or may be packaged as a solvent free system in pails, drums or other suitable containers, preferably in the absence of light, until ready for use. The make coats so packaged may be delivered to a hot-melt applicator system with the use of pail unloaders and the like. Alternatively, the hot melt make coats of the invention may be delivered to conventional bulk hot melt applicator and dispenser systems in the form of sticks, pellets, slugs, blocks, pillows or billets.

It is also possible to provide the hot melt make coats of the invention as uncured, unsupported rolls of tacky, pressure sensitive adhesive film. Such films are useful in laminating the make coat to an abrasive article backing. It is desirable to roll the tacky film up with a release liner (for example, silicone-coated Kraft paper), with subsequent packaging in a bag or other container that is not transparent to actinic radiation.

The hot melt make coats of the invention may be applied to the abrasive article backing by extruding, gravure printing, or coating, (e.g., by using a coating die, a heated knife blade coater, a roll coater, a curtain coater, or a reverse roll coater). When applying by any of these methods, it is preferred that the make coat be applied at a temperature of about 100° to 125° C., more preferably from about 80° to 125° C. Coating is a desirable application method for use with J weight cloth backings and other fabric backings of similar porosity.

The hot melt make coats can be supplied as free standing, unsupported pressure sensitive adhesive films that can be laminated to the backing and, if necessary, die cut to a predefined shape before lamination. Lamination temperatures and pressures are selected so as to minimize degradation of the backing and bleed through of the make coat and may range from room temperature to about 120° C. and about 30 to 250 psi. A typical profile is to laminate at room temperature and 100 psi. Lamination is a particularly preferred application method for use with highly porous backings; for example, backings which are more porous than standard J weight cloth.

Preferably, the hot melt make coat is applied to the abrasive article backing by any of the methods described above, and once so applied is exposed to an energy source to initiate the curing of the epoxy-containing material. The epoxy-containing material is believed to cure or crosslink with itself the optional hydroxyl-containing material, and, perhaps, to some degree with the polyester component.

Curing of the hot melt make coat begins upon exposure of the make coat to any energy-producing source and continues for a period of time thereafter. The energy may be electromagnetic (e.g., radiation having a wavelength in the ultraviolet or visible region of the spectrum), accelerated particles (e.g., electron beam radiation), or thermal (e.g., heat or infrared radiation). Preferably, the energy is actinic radiation (i.e., radiation having a wavelength in the ultraviolet or visible spectral regions). Suitable sources of actinic radiation include mercury, xenon, carbon arc, tungsten filament lamps, sunlight, etc. Ultraviolet radiation, especially from a medium pressure mercury arc lamp, is most preferred. Exposure times may be from less than about 1 second to 10 minutes or more (to provide a total energy exposure of about 1.0 Joule/square centimeter ($J/cm^2$)) depending upon both the amount and the type of reactants involved, the energy source, the distance from the energy source, and the thickness of the make coat to be cured.

The make coats may also be cured by exposure to electron beam radiation. The dosage necessary is generally from less than 1 megarad to 100 megarads or more. The rate of curing tends to increase with increasing amounts of initiator at a given energy exposure. The rate of curing also increases with increased energy intensity.

Those hot melt make coats which include a polyether polyol that retards the curing rate are particularly desirable because the delayed cure enables the make coat to retain its pressure sensitive properties for a time sufficient to permit abrasive particles to be adhered thereto after the make coat has been exposed to the energy source. (A similar effect is possible by using a metallocene salt initiator without a polyether polyol.) The abrasive particles may be applied until the make coat has sufficiently cured that the particles will no longer adhere, although to increase the speed of a commercial manufacturing operation it is desirable to apply the abrasive particles as soon as possible, typically within a few seconds of the make coat having been exposed to the energy source. Thus it will be recognized that the polyether polyol can provide the hot melt make coats with an open time. That is, for a period of time (the open time) after the make coat has been exposed to the energy source, it remains sufficiently tacky and uncured for the abrasive particles to be adhered thereto. The abrasive particles are projected into the make coat by any suitable method, preferably by electrostatic coating.

The time to reach full cure may be accelerated by post curing the make coat with heat, such as in an oven. Post curing can also affect the physical properties of the make coat and is generally desirable. The time and temperature of the post cure will vary depending upon the glass transition temperature of the polyester component, the concentration of the initiator, the energy exposure conditions, and the like. Post cure conditions can range from less than 1 minute at a temperature of about 150° C. to longer times at lower temperatures. Typical post cure conditions are about 2 minutes at a temperature of about 80° C.

In an alternative manufacturing approach, the make coat is applied to the backing and the abrasive particles are then projected into the make coat followed by exposure of the make coat to an energy source. While the total energy requirements for curing the make coat in this process are about the same as in the process in which the make coat is exposed to energy before the abrasive particles are applied, the use of less intense energy for a longer period of time is preferred. Thermal post curing is not generally required in the practice of this alternative method.

If the abrasive layer comprises a dispersion of abrasive particles in a make coat, an abrasive slurry comprising the particles and the make coat is prepared and coated onto the backing by roll coating, dip coating, knife coating, and the like. The make coat may then be cured by the processes described above.

Size coat 20 may be subsequently applied over the abrasive particles and the make coat as a flowable liquid by a variety of techniques such as roll coating, spray coating or curtain coating and can be subsequently cured by drying, heating, or with electron beam or ultraviolet light radiation. The particular curing approach may vary depending on the chemistry of the size coat. Optional super size coating 22 may be applied and cured in a similar manner.

Optional back size coating 24 may be applied to backing 12 using any of a variety of conventional coating techniques such as dip coating, roll coating, spraying, Meyer bar, doctor blade, gravure printing, thermomass transfer, flexographic printing, screen printing, and the like.

The make coats of the invention provide a unique balance of highly desirable properties. As solvent free formulations, they are easily applied using conventional hot melt dispensing systems. Consequently, they can be supplied as pressure sensitive adhesive films well suited for lamination to a backing. The inclusion of a polyester component provides the make coats with pressure sensitive properties which facilitates the application of the abrasive particles thereto. The provision of a polyether polyol of appropriate molecular weight and functionality provides the make coats of the invention with an open time subsequent to energy exposure that permits the abrasive particles to be projected into the make coat after it has been exposed to energy. However, the hot melt composition cures to yield a tough, durable aggressively bonded crosslinked, thermoset make coat.

The invention will be more fully understood with reference to the following nonlimiting examples in which all parts refer to parts by weight. Abbreviations used in the examples have the definitions shown in the following schedule.

| | |
|---|---|
| DYNAPOL S1402 | A high molecular weight polyester with low crystallinity. (Commercially available from Hüls America.) |
| EPON 828 | A bisphenol A epoxy resin having an epoxy equivalent weight of about 185–192 grams/equivalent. (Commercially available from Shell Chemical.) |

-continued

| | |
|---|---|
| EPON 1001F | A bisphenol A epoxy resin having an epoxy equivalent weight of about 525–550 grams/equivalent. (Commercially available from Shell Chemical.) |
| tBOX | di-t-butyl oxalate, an accelerator. |
| CHDM | cyclohexanedimethanol, a hydroxyl-containing material. |
| VORANOL 230–238 | A polyol adduct of glycerol and propylene oxide having a hydroxyl number of 38. (Commercially available from Dow Chemical Company.) |
| COM | $eta^6$-[xylenes (mixed isomers)]$eta^5$-cyclopentadienyliron (1+) hexafluoroantimonate, an initiator. |
| AMOX | di-t-amyloxalate, an accelerator. |
| TSA | Triphenyl sulfonium hexafluoroantimonate, an initiator. |
| BORDEN 8505 | A urea-formaldehyde resin. (Commercially available from Borden, Inc.) |

EXAMPLE 1

The coated abrasive article of example 1 included a J weight cotton backing that had been wet and stretched but not sealed. A make coat comprising DYNAPOL S1402 (40.4 parts), EPON 828 (29.3 parts), EPON 1001F (29.9 parts), CHDM (2.4 parts), COM (1.0 part), and AMOX (0.6 part) was prepared by preheating the EPON 828, the EPON 1001F, and the DYNAPOL S1402 in a suitable reaction vessel at 121° C. for 30 minutes. The CHDM was then added with mixing at 121° C. for 3 hours until a homogeneous melt blend was obtained. The temperature was then reduced to 100° C. and the AMOX and the COM were added with stirring at 100° C. for one hour.

The make coat was applied at 125° C. with a die coater to the front side of the backing at a weight of about 84 grams/square meter ($g/m^2$). The make coat (on the backing) was exposed to a UVXL 200/300/400 watts/inch three-setting type "D" ultraviolet lamp (available from Aetek International, Inc. (Plainfield, Ill.), running on its 200 watts per inch setting with a web feed rate of 0.10 meter/second so as to provide a total energy exposure of about 50 to 60 milliJoules/$cm^2$. The make coat was exposed to the ultraviolet radiation immediately before grade 80 fused aluminum oxide abrasive particles were electrostatically projected into the make coat at a weight of about 327 $g/m^2$. The resulting product was then post cured for 30 minutes at 80° C.

A 60% solids size coat comprising BORDEN 8405 (6500 parts), feldspar (2100 parts), aluminum chloride (452 parts, 10% solids in water), and water (948 parts) was roll coated over the abrasive particles at a wet weight of about 159 $g/m^2$. The resulting article was heated for 45 minutes at 66° C. and then flexed before testing.

EXAMPLE 2

Example 2 was prepared according to the procedure described in example 1 except that the make coat was applied at a weight of about 126 $g/m^2$.

Comparative Examples 1 and 2

Two comparative examples using commercially available coated abrasive articles were also provided. Comparative example (C.E.) 1 was a grade 80 3M 211 ELEK-TRO-CUT coated abrasive article having a J weight cloth backing and commercially available from 3M Company. Comparative example 2 was a grade 80 3M 311T BLUE GRIT coated abrasive article having a J weight cloth backing, also commercially available from 3M Company.

EXAMPLE 3

A make coat comprising DYNAPOL S1402 (40.0 parts), EPON 828 (15.0 parts), EPON 1001F (29.0 parts), VORANOL 230-238 (15.0 parts), and TSA (1.0 part) was prepared by blending those materials in a suitable vessel for 15 minutes at 121° C. until the ingredients were melt blended followed by an additional 5 minutes of mixing. The make coat was applied to a backing like that used in example 1 at 125° C. with a heated knife and at a weight of about 49 $g/m^2$. Grade 120 aluminum oxide abrasive particles were drop coated into the make coat at a weight of about 209 $g/m^2$. The resulting product was immediately exposed to a bank of F15T8350BL (Sylvania Corp.) low intensity ultraviolet radiation lamps from the mineral side (1000 milliJoules/$cm^2$ at a web feed rate of 0.51 centimeter/second for 10 minutes) in a nitrogen environment. The size coat of example 1 was then roll coated over the abrasive particles at a wet weight of about 109 $g/m^2$.

EXAMPLE 4

Example 4 was prepared according to the procedure of example 3 except that the make coat was applied at a weight of about 123 $g/m^2$. Examples 3 and 4 demonstrate that the make coat can be energy cured after the abrasive particles have been applied.

Comparative Example 3

Comparative example 3 was a grade 120 3M 311T BLUE GRIT coated abrasive article having a J weight utility cloth backing, commercially available from 3M Company.

EXAMPLE 5

A make coat was prepared according to the procedure described in example 1 and coated at 125° C. with a heated knife coater between two approximately 102 μm thick release liners at a weight of about 84 $g/m^2$ so as to provide a free standing tacky, pressure sensitive adhesive film. One release liner was removed and the exposed face of the adhesive film was laminated to a cotton backing like that used in example 1 at a pressure of about 690 kiloPascals and at room temperature (about 20° to 22° C.). The make coat was irradiated as described in example 1. The resulting article was then coated with abrasive particles, thermally post cured, provided with a size coat, heated and flexed, all as described in example 1. Example 5 demonstrates that the make coats used in coated abrasive articles according to the invention can be provided as free standing, tacky pressure sensitive adhesive films that can be laminated to a porous cloth backing.

Examples 1 to 5 and comparative examples 1 to 3 were tested according to some or all of the following procedures.

Test Procedures

90° C. Peel Test.

To measure the adhesion between the backing and the make coat, the coated abrasive article of several of the examples and comparative examples was converted into a sample about 8 cm wide by 25 cm long. One-half the length of a wooden board (17.78 cm long by 7.62 wide cm by 0.64 cm thick) was coated with JET-MELT 3779-PG adhesive commercially available from 3M Company. The entire width of, but only the first 15 cm of the length of, the coated abrasive article was coated on its abrasive particle side with the same adhesive. The side of the article bearing the abrasive particles and the adhesive was attached to the side of the board containing adhesive such that the 10 cm portion of the coated abrasive article not bearing adhesive overhung the board. Pressure was applied to intimately bond the board and the article. The test set-up was constructed in a manner that ensured that separation during the test would occur between layers of the coated abrasive article rather than between the coated abrasive article and the wooden board.

The abrasive article was then scored in a straight line such that its width was reduced to 5.1 cm. The resulting coated abrasive article/wooden board composite was mounted horizontally in the lower jaw of a SINTECH tensile testing machine with approximately 1 cm of the overhanging portion of the coated abrasive article mounted in the upper jaw. The distance between the jaws was 12.7 cm and the separation rate was 0.5 cm/sec with the coated abrasive article being pulled away from the wooden board at an angle of 90° C. so as to separate the make coat from the cloth backing. The separation force was recorded in kilograms per centimeter of article width (kg/cm), larger values indicating better adhesion between the make coat and the cloth backing. Preferably the separation force is at least 1.8 kg/cm, more preferably at least 2 kg/cm. The results are reported below in Table 1.

Disc Test.

The disc test was used to evaluate the ability of a coated abrasive article to abrade a polymeric workpiece, with the results shown below in Table 1. More specifically, the coated abrasive articles of examples 1 and 2 and comparative examples 1 and 2 were die cut to provide 10.2 cm diameter discs that were bonded to a foam back-up pad with a pressure sensitive adhesive. The coated abrasive disc and foam back-up pad were mounted in a Schiefer testing apparatus to dry abrade a polymethylmethacrylate workpiece for 500 revolutions under a 4.5 kg load. The workpiece was a disc having an opening through a central portion thereof. The outside diameter of the disc was 10.2 cm and the inside diameter was 5.1 cm. The amount of abraded polymer in grams (g) was weighed. The surface finish of the abraded workpiece was assessed by measuring $R_a$ (the arithmetic average of the scratch depth in microinches ($\mu$in)). The weight of abraded polymer should be at least about 1.3 g.

Rocker Drum Test.

A rocker drum test was used to evaluate the ability of a coated abrasive article to abrade a metal workpiece. More specifically, the coated abrasive articles of examples 3 and 4 and comparative examples 1 and 2 were converted into 10.2 cm wide by 15.2 cm long sheets that were mounted to the cylindrical drum of rocker drum testing machine which oscillated (rocked) back and forth at the rate of about 60 strokes per minute (one complete back and forth cycle equalling one stroke). The oscillatory motion against a stationery 1.3 cm wide by 15.2 cm long by 1.3 cm thick Type 3008F aluminum workpiece wore an approximately 1.3 cm wide by 14.0 cm long path on the coated abrasive article. The force applied to the workpiece was 2.7 kg. The weight of the abraded aluminum in grams (g) was measured with the results shown below in Table 1. The number following the slash in the table indicates the number of cycles to which the test piece was subjected.

TABLE 1

| Example | 90° Peel Force (kg/cm) | Material Abraded (g) | | Ra ($\mu$in) |
| --- | --- | --- | --- | --- |
| | | Disc Test | Rocker Drum Test | |
| 1 | 2.0 | 1.37 | N.T. | 97 |
| 2 | 2.0 | 1.28 | 0.17/62 | 90 |
| C.E. 1 | N.T. | 1.31 | N.T. | 113 |
| C.E. 2 | 2.0 | 1.32 | 0.98/402 | 105 |
| 3 | 2.3 | N.T. | 0.31/100 | N.T. |
| 4 | 2.9 | N.T. | 0.31/100 | N.T. |
| C.E. 3 | N.T. | N.T. | 0.32/100 | N.T. |
| 5 | 2.1 | 1.64 | 0.83/320 | N.T. |

N.T. = Not tested.

The data of Table 1 show that examples 1 and 2, as compared to comparative examples 1 and 2, performed similarly in the peel force and disc tests with a slightly finer finish but without the need for a saturant coat or the like on the backing. Examples 3 and 4, as compared to comparative example 3, indicate that even without a saturant coat or the like on the backing, these coated abrasive articles performed similarly to a commercially available coated abrasive article.

Numerous modifications and variations are possible within the scope of the foregoing specification and drawings without departing from the invention which is defined in the accompanying claims.

The embodiments for which an exclusive property or privilege is claimed are defined as follows:

1. A coated abrasive article comprising:
   (a) a presized backing comprising a backing and a crosslinked presize layer on the backing, wherein the presize layer comprises the reaction product of an epoxy-containing material, a polyester component, and an effective amount of an initiator for energy curing the presize layer, and wherein the crosslinked presize layer is a hot melt pressure sensitive adhesive before crosslinking;
   (b) a first binder on the presized backing; and
   (c) a plurality of abrasive particles in the first binder, said abrasive particles outwardly project from the first binder.

2. An abrasive article according to claim 1 wherein the presize layer comprises:
   (a) from about 2 to 95 parts of an epoxy-containing material;
   (b) correspondingly, from about 98 to 5 parts of a polyester component, wherein the sum of (a)+(b) equals 100 parts;
   (c) an effective amount of an initiator for energy curing the presize layer; and
   (d) an optional hydroxyl-containing material having a hydroxyl functionality of at least 1.

3. An abrasive article according to claim 1 wherein the polyester component has a viscosity which exceeds 10,000 milliPascals at 121° C.

4. An abrasive article according to claim 3 wherein the polyester component has a number average equivalent weight of about 7500 to 100,000.

5. An abrasive article according to claim 4 wherein the polyester component has a number average equivalent weight of about 7500 to 25,000.

6. An abrasive article according to claim 5 wherein the polyester component has a number average equivalent weight of about 7500 to 15,000.

7. An abrasive article according to claim 1 wherein the polyester component is the reaction product of (a) a dicarboxylic acid selected from the group consisting of saturated aliphatic dicarboxylic acids containing from 4 to 12 carbon atoms (and diester derivatives thereof) and aromatic dicarboxylic acids containing from 8 to 15 carbon atoms (and diester derivatives thereof) and (b) a diol having 2 to 12 carbon atoms.

8. An abrasive article according to claim 2 wherein the hydroxyl-containing material is present and is a polyoxyalkylene polyol.

9. An abrasive article according to claim 8 wherein the polyoxyalkylene polyol is selected from the group consisting of polyoxyethylene glycols, polyoxyethylene triols, polyoxypropylene glycols, and polyoxypropylene triols.

10. An abrasive article according to claim 9 wherein the number average equivalent weight of the polyoxyethylene glycols and the polyoxypropylene glycols is about 31 to 2250 and further wherein the number average equivalent weight of the polyoxyethylene triols and the polyoxypropylene triols is about 80 to 350.

11. An abrasive article according to claim 2 wherein the hydroxyl-containing material is present and is cyclohexane dimethanol.

12. An abrasive article according to claim 2 wherein the presize layer comprises from 2 to 80 parts of the epoxy-containing material and, correspondingly, from 98 to 20 parts of the polyester component.

13. An abrasive article according to claim 12 wherein the presize layer comprises from 2 to 60 parts of the epoxy-containing material and, correspondingly, from 98 to 40 parts of the polyester component.

14. An abrasive article according to claim 1 wherein the presize layer comprises the reaction product of an epoxy-containing material and a polyester component.

15. An abrasive article according to claim 14 wherein the polyester component is hydroxyl-terminated.

16. An abrasive article according to claim 14 wherein the presize layer further comprises a photoinitiator for crosslinking the presize layer.

17. The abrasive article of claim 1 wherein the first binder comprises a hot melt pressure sensitive adhesive before crosslinking.

18. The abrasive article of claim 17 wherein the first binder comprises the reaction product of an epoxy-containing material, a polyester component, and an effective amount of an initiator for energy curing the first binder.

* * * * *